US009371622B2

(12) United States Patent
Buckley

(10) Patent No.: US 9,371,622 B2
(45) Date of Patent: Jun. 21, 2016

(54) SYSTEM AND METHOD TO AUTOMATICALLY DETERMINE IRREGULAR POLYGON FOR ENVIRONMENTAL HAZARD CONTAINMENT MODULES

(71) Applicant: James Connor Buckley, Ridgefield, CT (US)

(72) Inventor: James Connor Buckley, Ridgefield, CT (US)

( * ) Notice: Subject to any disclaimer, the term of this patent is extended or adjusted under 35 U.S.C. 154(b) by 373 days.

(21) Appl. No.: 14/059,509

(22) Filed: Oct. 22, 2013

(65) Prior Publication Data

US 2015/0112461 A1 Apr. 23, 2015

(51) Int. Cl.

| | |
|---|---|
| ***G05B 19/418*** | (2006.01) |
| ***E02B 15/08*** | (2006.01) |
| ***E02B 15/06*** | (2006.01) |
| ***A62C 3/02*** | (2006.01) |
| ***A62C 3/06*** | (2006.01) |

(52) U.S. Cl.

CPC ............... *E02B 15/08* (2013.01); *A62C 3/0278* (2013.01); *A62C 3/06* (2013.01); *E02B 15/06* (2013.01); *E02B 15/0821* (2013.01)

(58) Field of Classification Search

CPC . G05D 1/0214; G05D 1/0234; G05D 1/0274; G05D 1/0088; G05D 2201/0207; Y10S 901/01; Y10S 707/99943; Y10S 901/46; B25J 9/0003; B25J 9/1679

See application file for complete search history.

(56) References Cited

U.S. PATENT DOCUMENTS

| | | | | |
|---|---|---|---|---|
| 5,160,842 A * | 11/1992 | Johnson | G01C 11/00 | 250/330 |
| 6,289,331 B1 * | 9/2001 | Pedersen | G06Q 10/06 | 701/27 |
| 6,364,026 B1 * | 4/2002 | Doshay | A62C 3/0271 | 169/36 |
| 6,523,629 B1 * | 2/2003 | Buttz | B60D 1/00 | 180/14.2 |
| 6,556,981 B2 * | 4/2003 | Pedersen | G06Q 10/06 | 706/44 |
| 8,229,595 B2 * | 7/2012 | Seelinger | B25J 9/1697 | 700/245 |
| 8,379,967 B1 * | 2/2013 | Bush | G05D 1/0297 | 382/153 |
| 8,892,253 B2 * | 11/2014 | Park | B25J 5/007 | 700/248 |
| 8,924,011 B2 * | 12/2014 | Park | G06N 3/008 | 700/245 |

(Continued)

OTHER PUBLICATIONS www.mathisfun.com/geometry/area-irregular-polygons.html, Area of Irregular Polygon.*

*Primary Examiner* — Darrin Dunn

(57) ABSTRACT

According to some embodiments, an environmental hazard containment module may exchange location information with a plurality of remote containment modules. Hazard location information associated with an environmental hazard may be detected, and a containment configuration may be determined comprising a contiguous arrangement of the containment module and the plurality of remote containment modules such that the hazard location is within an area defined by the containment configuration. A motion portion may be instructed to move the containment module in accordance with the determined containment configuration. According to some embodiments, information associated with the containment configuration may be transmitted to the plurality of remote containment modules.

18 Claims, 12 Drawing Sheets

(56) References Cited

U.S. PATENT DOCUMENTS

| | | | | |
|---|---|---|---|---|
| 8,935,035 | B1 * | 1/2015 | Bogdanowicz | G08G 1/20 701/26 |
| 9,131,529 | B1 * | 9/2015 | Ayyagari | H04W 84/06 |
| 9,137,847 | B1 * | 9/2015 | Ayyagari | H04W 84/18 |
| 2006/0145023 | A1 * | 7/2006 | Babb | B64G 1/64 244/172.4 |
| 2007/0013510 | A1 * | 1/2007 | Yamada | G01S 13/74 340/539.1 |
| 2009/0015404 | A1 * | 1/2009 | Lin | B25J 9/1674 340/540 |
| 2009/0070281 | A1 * | 3/2009 | Solomon | G06N 3/12 706/13 |
| 2010/0094459 | A1 * | 4/2010 | Cho | G05D 1/0291 700/248 |
| 2010/0114374 | A1 * | 5/2010 | Cho | G06K 9/00201 700/259 |
| 2010/0219170 | A1 * | 9/2010 | Dane | B23K 26/0069 219/121.73 |
| 2010/0286824 | A1 * | 11/2010 | Solomon | G05D 1/0088 700/248 |
| 2011/0054689 | A1 * | 3/2011 | Nielsen | G05D 1/0088 700/258 |
| 2011/0082871 | A1 * | 4/2011 | Peters, II | G05D 1/0221 707/756 |
| 2011/0135189 | A1 * | 6/2011 | Lee | B25J 9/1682 382/153 |
| 2013/0103195 | A1 * | 4/2013 | Anhalt | B25J 9/163 700/248 |
| 2014/0299338 | A1 * | 10/2014 | Howard, Sr. | A62C 3/02 169/45 |
| 2014/0336818 | A1 * | 11/2014 | Posselius | G05D 1/0295 700/248 |
| 2015/0086270 | A1 * | 3/2015 | Shany | E02B 15/06 405/63 |

* cited by examiner

1100

| MODULE ID 1102 | STATUS 1104 | LOCATION 1106 | ROTATION 1108 | CONFIGURATION DATA 1110 | SENSOR DATA 1112 |
|---|---|---|---|---|---|
| CM_101 | EN ROUTE | LAT/LONG | 45 DEG | CONFIGURATION ONE, SEGMENT THREE | NONE |
| CM_102 | OFF | RELATIVE POSITION | 232 DEG | NOT ASSIGNED | NONE |
| CM_103 | IN PLACE | WIRELESS DATA LOCATION | 35 DEG | CONFIGURATION ONE | HAZARD: 35 DEG, 150 FT |
| CM_104 | IN PLACE | GPS DATA | 310 DEG | LAT/LONG AND ROTATION | IN HAZARD |

*FIG. 11*

SYSTEM AND METHOD TO AUTOMATICALLY DETERMINE IRREGULAR POLYGON FOR ENVIRONMENTAL HAZARD CONTAINMENT MODULES

FIELD

The present invention relates to environmental hazards and more particularly to environmental hazard containment modules.

BACKGROUND

The impact of environmental hazards can be extremely significant. For example, the Exxon Valdez oil spill that occurred in Prince William Sound resulted in over two billion dollars in clean-up costs and incalculable harm to wildlife. More recently, the British Petroleum oil spill in the Gulf of Mexico resulted in more than 37 billion dollars of losses. Note that oil spills are not the only type of environmental hazard that can cause significant damage. For example, millions of acres of forest and a large number of homes are lost each year to wild fires in the United States.

Once an environmental hazard occurs, it may be important to contain the hazard in order to limit the impact on the environment. For example, if an oil spill can be contained within a particular area, damage to other areas may be reduced or avoided. It would therefore be desirable to provide systems and methods to facilitate the containment of environmental hazards in an automated, efficient, and accurate manner.

SUMMARY

According to some embodiments, systems, methods, apparatus, computer program code and means may facilitate the containment of environmental hazards. In some embodiments, an environmental hazard containment module may exchange location information with a plurality of remote containment modules. Hazard location information associated with an environmental hazard may be detected, and a containment configuration may be determined comprising a contiguous arrangement of the containment module and the plurality of remote containment modules such that the hazard location is within an area defined by the containment configuration. A motion portion may be instructed to move the containment module in accordance with the determined containment configuration. According to some embodiments, information associated with the containment configuration may be transmitted to the plurality of remote containment modules.

Some embodiments comprise: means for exchanging location information with a plurality of remote containment modules; means for detecting hazard location information associated with an environmental hazard; means for automatically determining a containment configuration comprising a contiguous arrangement of the containment module and the plurality of remote containment modules such that the hazard location is within an area defined by the containment configuration; means for communicating with a motion portion to move the containment module in accordance with the determined containment configuration; and means for transmitting information associated with the containment configuration to the plurality of remote containment modules A technical effect of some embodiments of the invention is an improved and computerized method to facilitate the containment of environmental hazards. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 11 is a tabular portion of environmental hazard containment module location database according to some embodiments.

DETAILED DESCRIPTION

Once an "environmental hazard" occurs, it may be important to contain the hazard in order to limit the impact on the environment. For example, if a wild fire can be contained within a particular area, damage to other areas may be reduced or avoided. As used herein, the term "environmental hazard" may refer to any situation where a movable substance can cause damage to the environmental (including, for example, radiation, gases, etc.). It would therefore be desirable to provide systems and methods to facilitate the containment of environmental hazards in an automated, efficient, and accurate manner.

Figure 1:
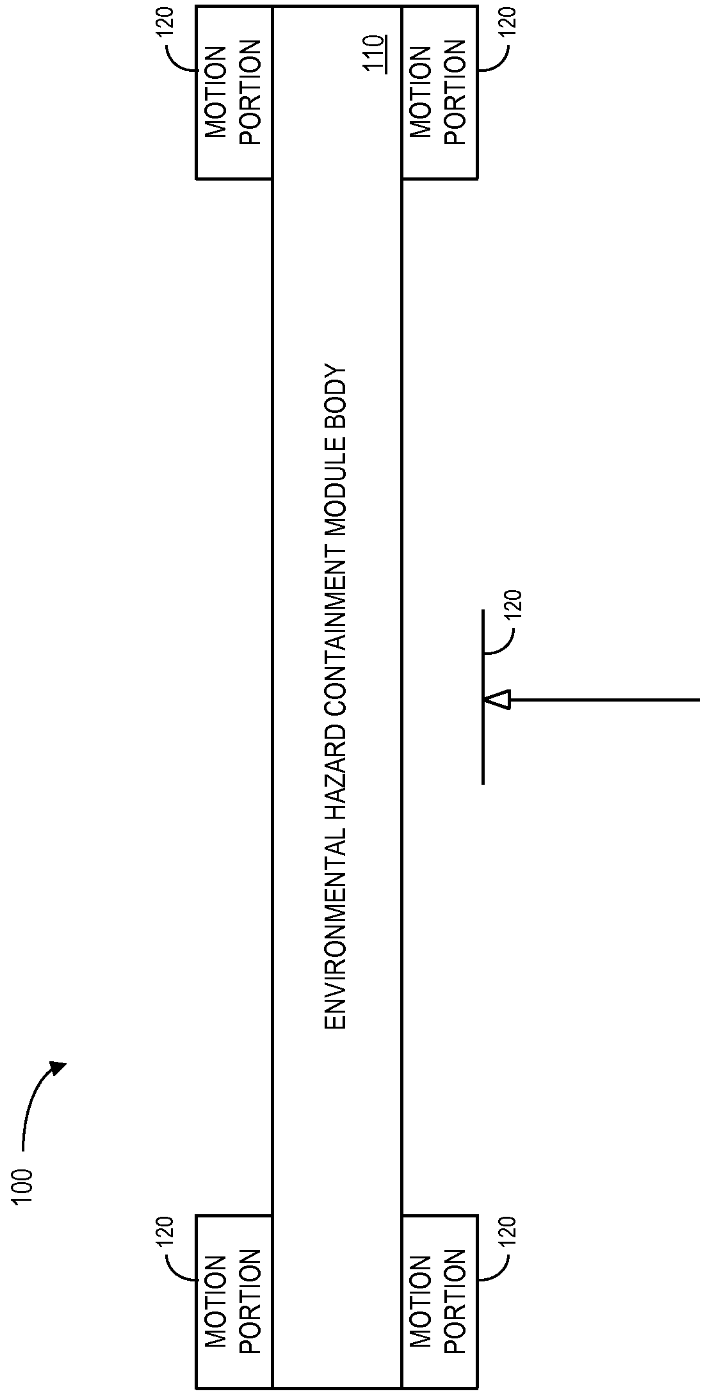
FIG. 1 is block diagram of an environmental hazard containment module according to some embodiments of the present invention.

FIG. 1 is block diagram of an environmental hazard containment module 100 according to some embodiments of the present invention. The environmental hazard containment module 100 includes an environmental hazard containment module body 110 and one or more motion portions 120. The environmental hazard containment module body 110 may comprise, for example, a tube, a float, or any other barrier 120 that may help contain an environmental hazard from spreading. In the case of a floatable environmental hazard containment module 100, the motion portions 120 might include any devices able to move the environmental hazard containment module 100 in water, such as propellers or water jets. In the case of an environmental hazard containment module 100 adapted to move on land, the motion portions 120 might be associated with wheels, tank treads, or leg-like devices. Although instructions to motion portions 120 are described herein with respect to movement to a containment configuration, it will be understood that the motion portions 120 may be instructed for other reasons (e.g., to have the containment module 100 "stay in place" despite wind, currents, etc.). According to some embodiments, the environmental hazard containment module 100 might "automatically" work together with other environmental hazard containment modules to help contain a hazard. As used herein, the term "automated" may refer to, for example, actions that can be performed with little (or no) intervention by a human.

Figure 2:
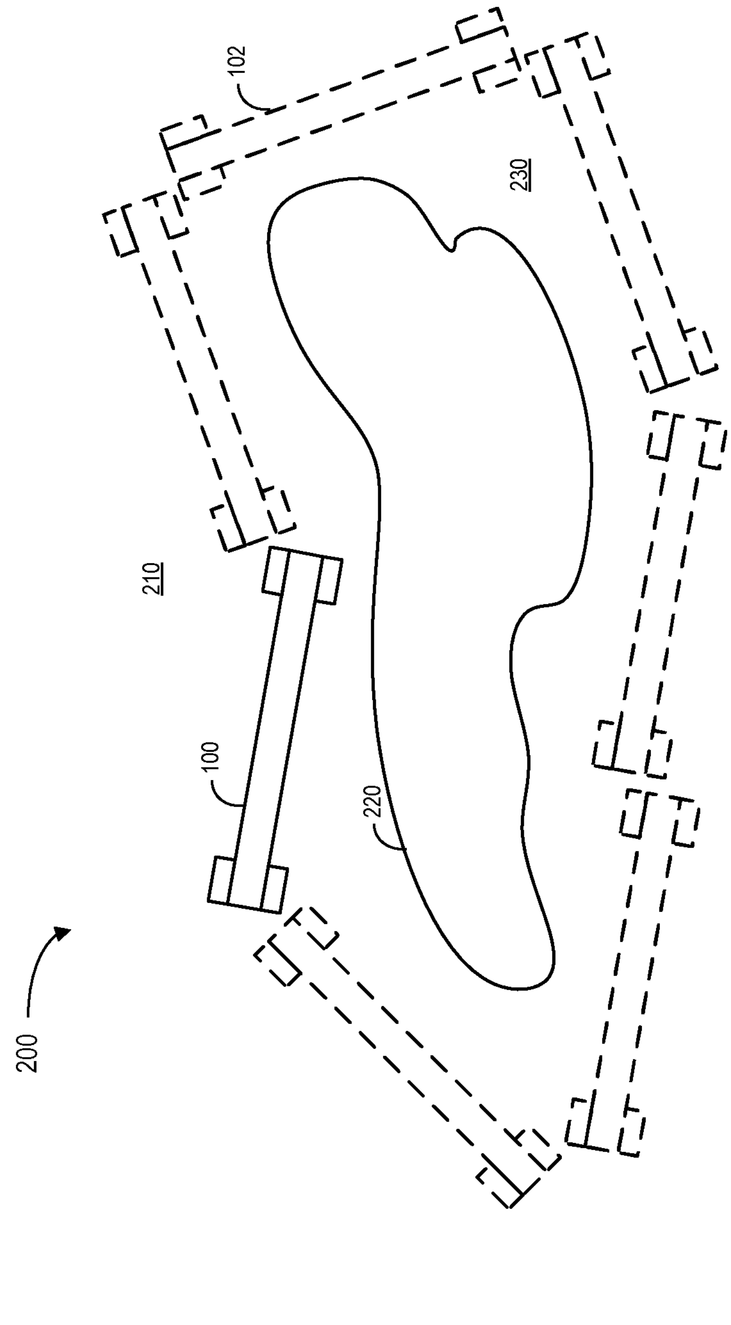
FIG. 2 is block diagram of an environmental hazard containment system according to some embodiments of the present invention.

FIG. 2 is block diagram of an environmental hazard containment system 200 according to some embodiments of the present invention. In particular, the environmental hazard containment module 100 is working together with other, remote environmental hazard containment modules 102 within an environment 210 (e.g., a water surface or forest floor) to contain an environmental hazard 220. The environmental hazard containment module 100 and other environmental hazard containment modules 102 have arranged themselves contiguously to create an area 230 within which the hazard 220 may be contained.

According to some embodiments, the environmental hazard containment module 100 may act as a "leading" module and direct the other modules 102 where they should position themselves. According to other embodiments, each module 100, 102 is self-directed and decides how to be fit within the contiguous arrangement. That is, the system 200 may rely on distributed or swarm robotic intelligence where a plurality of physical robots and artificial intelligence computers work together toward a common goal. That is, a desired collective behavior (containment of an environmental hazard) may emerge from the interactions between the robots and interactions of robots with the environment 210.

As used herein, devices, including those associated with the modules 100, 102, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a limited number of modules 100, 102 are shown in FIG. 2, any number of such devices may be included. Moreover, various devices described herein might be combined according to embodiments of the present invention.

Figure 3:
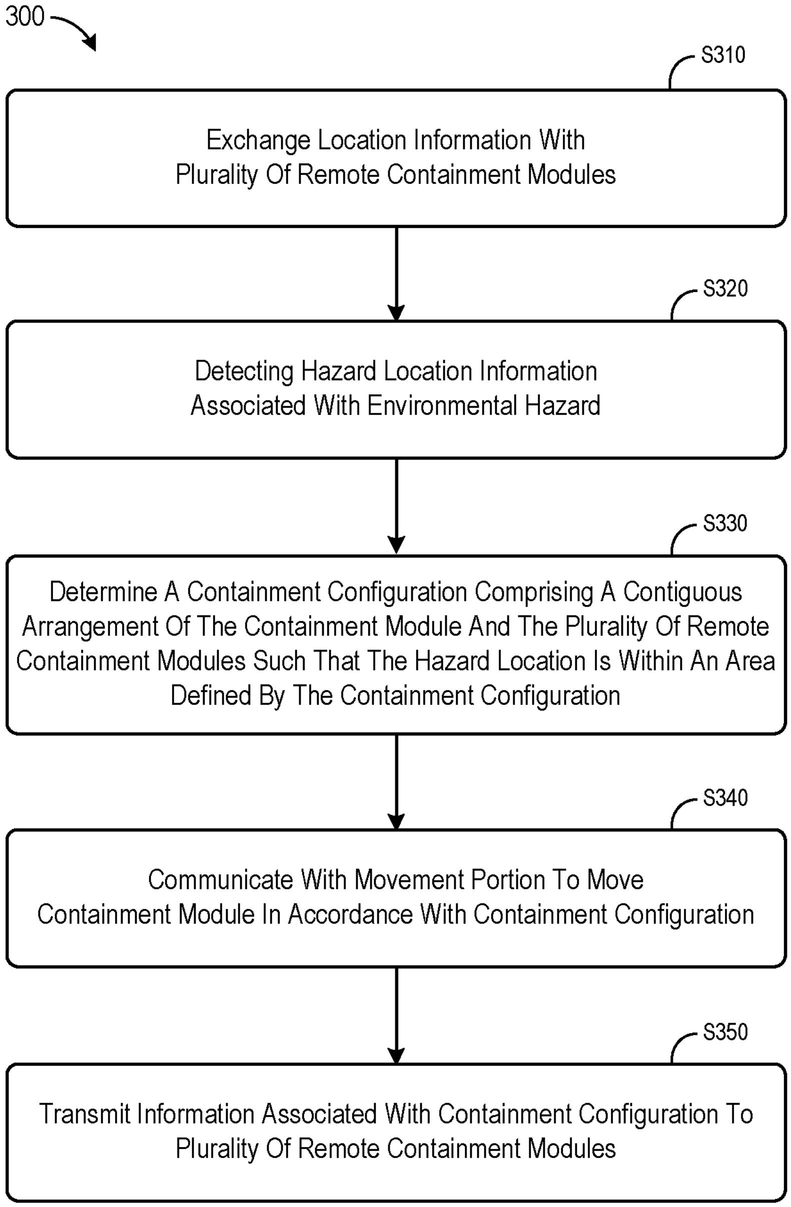
FIG. 3 illustrates a method that might be performed in accordance with some embodiments.

FIG. 3 illustrates a method that might be performed by some or all of the elements of the system 200 described with respect to FIG. 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, location information may be exchanged with a plurality of remote containment modules. The location information might comprise, for example, absolute or relative X and Y coordinates Global Positioning System ("GPS") latitudes and longitudes, orientation information, etc. At S320, hazard location information associated with an environmental hazard (e.g., a liquid hazard or a fire hazard) may be detected. The hazard location information might be detected locally by the containment module or be received from a remote sensor.

At S330, a containment configuration comprising a contiguous arrangement of a containment module and a plurality of remote containment modules may be automatically determined such that the hazard location is within an area defined by the containment configuration. According to some embodiments, the determination of the containment configuration is associated with an irregular polygon and includes optimizing the area of the irregular polygon with respect to the hazard location information. At S340, a motion portion may be directed to move the containment module in accordance with the determined containment configuration. For example, set of propellers may be activated and/or rotated to move the module to an appropriate position in the containment configuration. Note that the determination of the containment configuration might include, for example: how many modules are required, what types of modules are required (note that different types of modules may be of different lengths), etc. At S350, information associated with the containment configuration may be transmitted to the plurality of remote containment modules.

Figure 4:
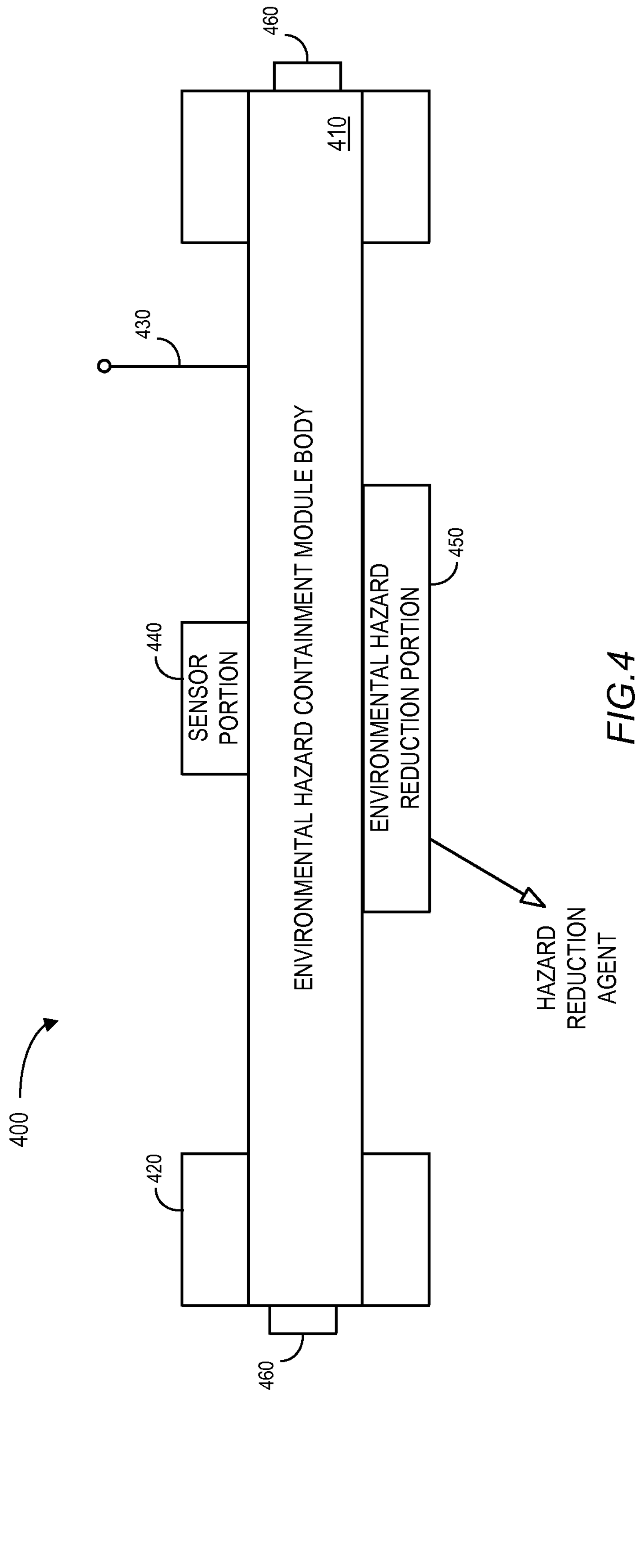
FIG. 4 is block diagram of an environmental hazard containment module according to another embodiment of the present invention.

According to some embodiments, a containment module may be able to locally detect the presence and/or location of an environmental hazard. For example, FIG. 4 illustrates an environmental hazard containment module 400 having a main body 410, moving portions, a communication antenna 430, and a sensor portion 440. The sensor portion 440 might, for example, detect the presence of oil, use thermo-imaging, etc.

According to some embodiments, the environmental hazard containment module 400 may also include an environmental hazard reduction portion 450. The environmental hazard reduction portion 450 may output a hazard reduction agent to help mitigate damage caused the hazard. In the case of an oil spill, for example, the hazard reduction agent might be associated with a detergent or other chemical, an oil-consuming microbe, etc. In the case of a wild fire, the hazard reduction agent might be associated with water or a flame-retarding chemical.

According to some embodiments, the environmental hazard containment module 400 may also include one or more attaching portions 460 adapted to attach to other containment modules. The attaching portions 460 might comprise, for example, electro-magnets that may be activated to help the module 400 attach to neighboring modules in a containment configuration.

Figure 5:
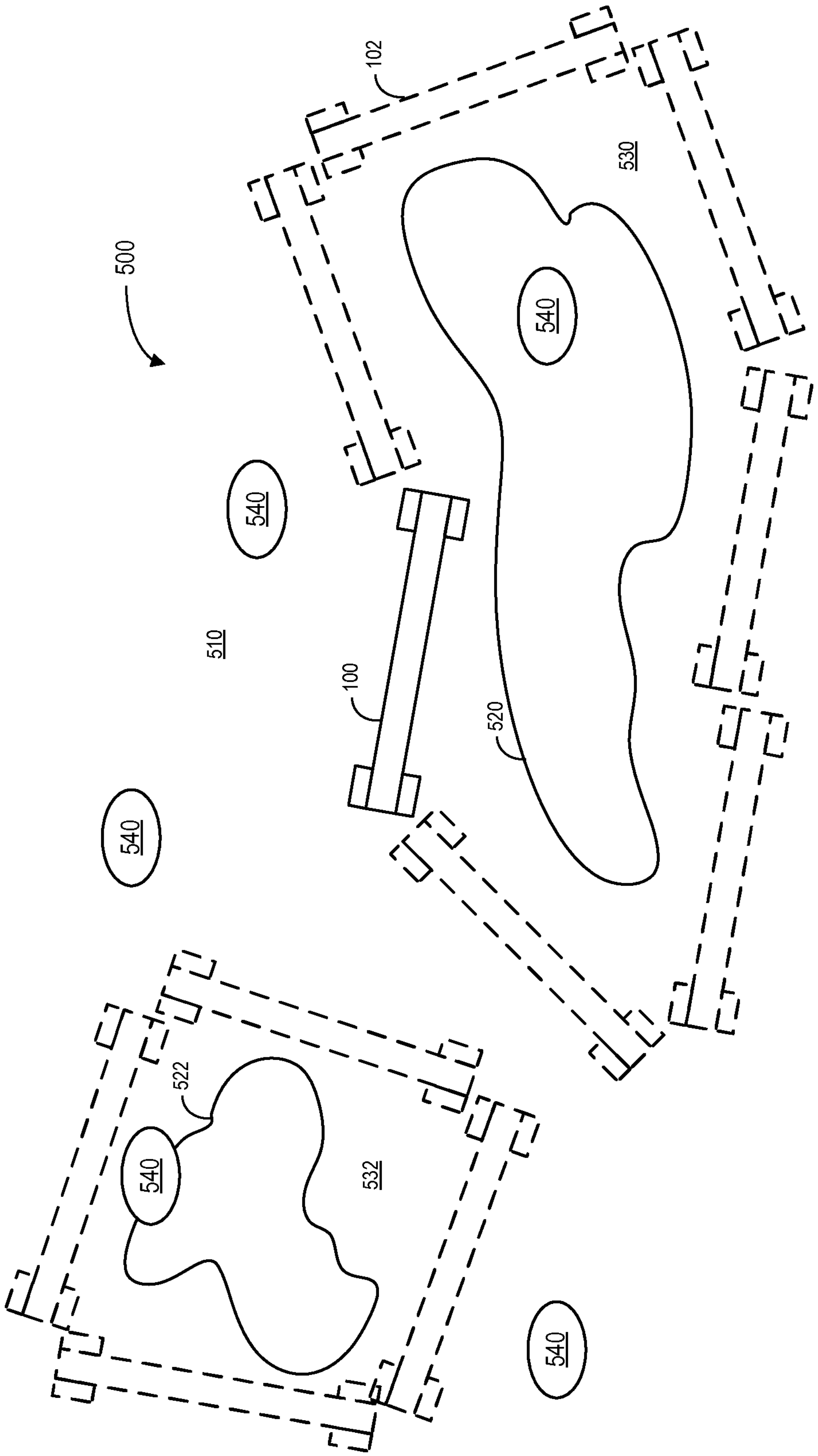
FIG. 5 is block diagram of an environmental hazard containment system according to another embodiment of the present invention.

In the example system 200 of FIG. 2, a single containment configuration was illustrated. 16. Note, however, that an environmental hazard containment module system might involve a plurality of containment configurations that are determined, and some of the containment configurations might include only remote containment modules. For example, FIG. 5 is block diagram of an environmental hazard containment system 500 according to another embodiment of the present invention. As before, the environmental hazard containment module 100 is working together with other, remote environmental hazard containment modules 102 within an environment 510 (e.g., a water surface or forest floor) to contain a first environmental hazard 520. The environmental hazard containment module 100 and other environmental hazard containment modules 102 have arranged themselves contiguously to create an area 530 within which the hazard 520 may be contained.

In this example, however, the system 500 also includes several remote environmental hazard containment modules 102 within the environment 510 (e.g., a water surface or forest floor) to contain a second environmental hazard 522. The remote environmental hazard containment modules 102 have arranged themselves contiguously to create another area 532 within which the second hazard 522 may be contained. In the example of FIG. 5, one or more sensors 540 may be deployed within the environment 510 to help provide hazard location information to the containment modules 100, 102. In the case of an oil spill, for example, the sensors 540 might float on the surface of the ocean or hover in the air above the oil spill.

Figure 6:
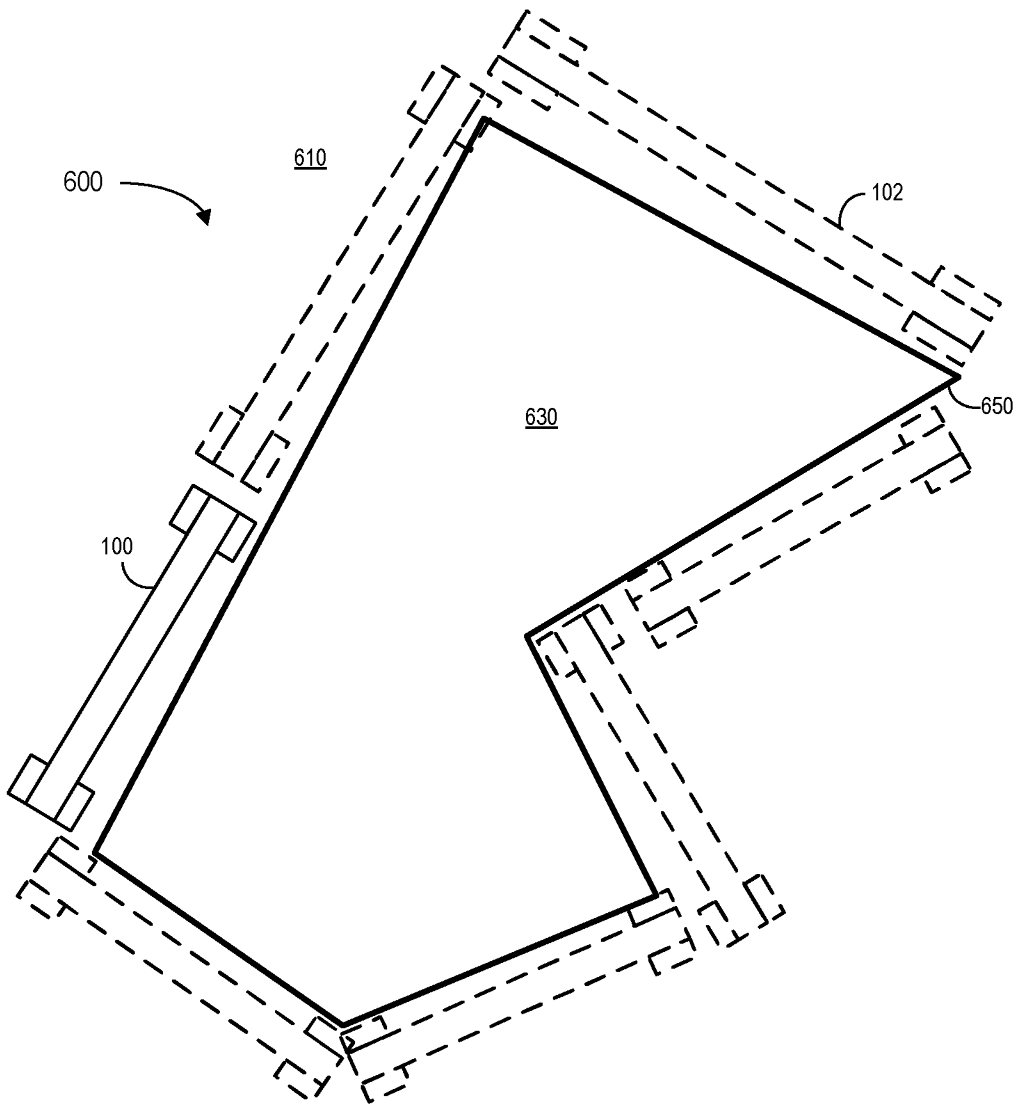
FIG. 6 illustrates geometric considerations for an environmental hazard containment system in accordance with some embodiments of the present invention.

FIG. 6 illustrates geometric considerations 600 for an environmental hazard containment system in accordance with some embodiments of the present invention. As before, the environmental hazard containment module 100 is working together with other, remote environmental hazard containment modules 102 within an environment 610 to create an area 630 within which a hazard may be contained. Note that the containment modules 100, 102 form an irregular polygon 650 defining the containment area 630 within the environment 610. In the example of FIG. 6, the six-sided irregular polygon 650 is formed using seven modules 100, 102, but note that any number of modules (including modules of different lengths) may be provided. Further note that two modules that are linked in a substantially linear manner may be considered a single side of the polygon 650.

Figure 7:
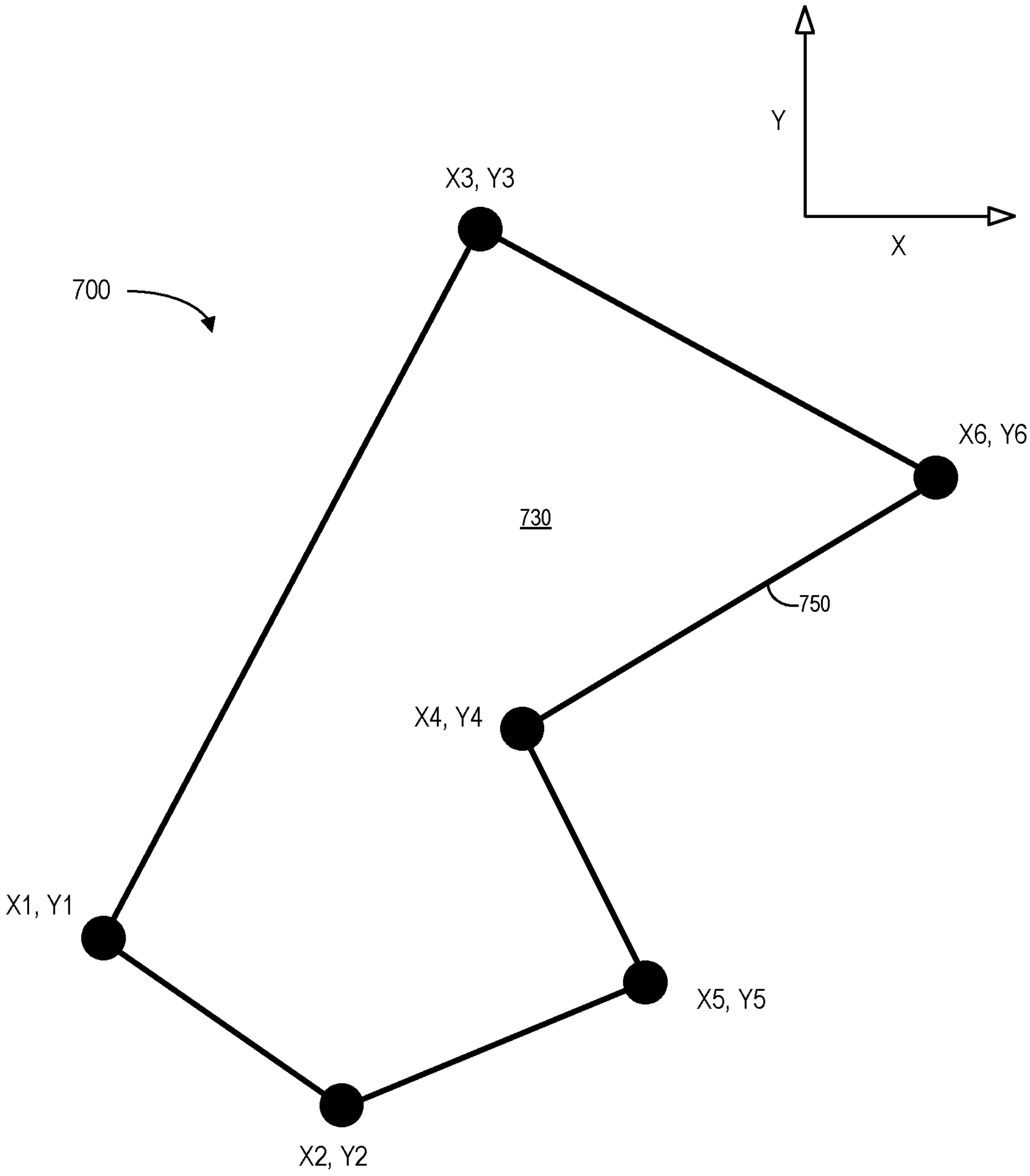
FIG. 7 illustrates a mathematical coordinate framework for an environmental hazard containment system in accordance with some embodiments of the present invention.
Figure 8:
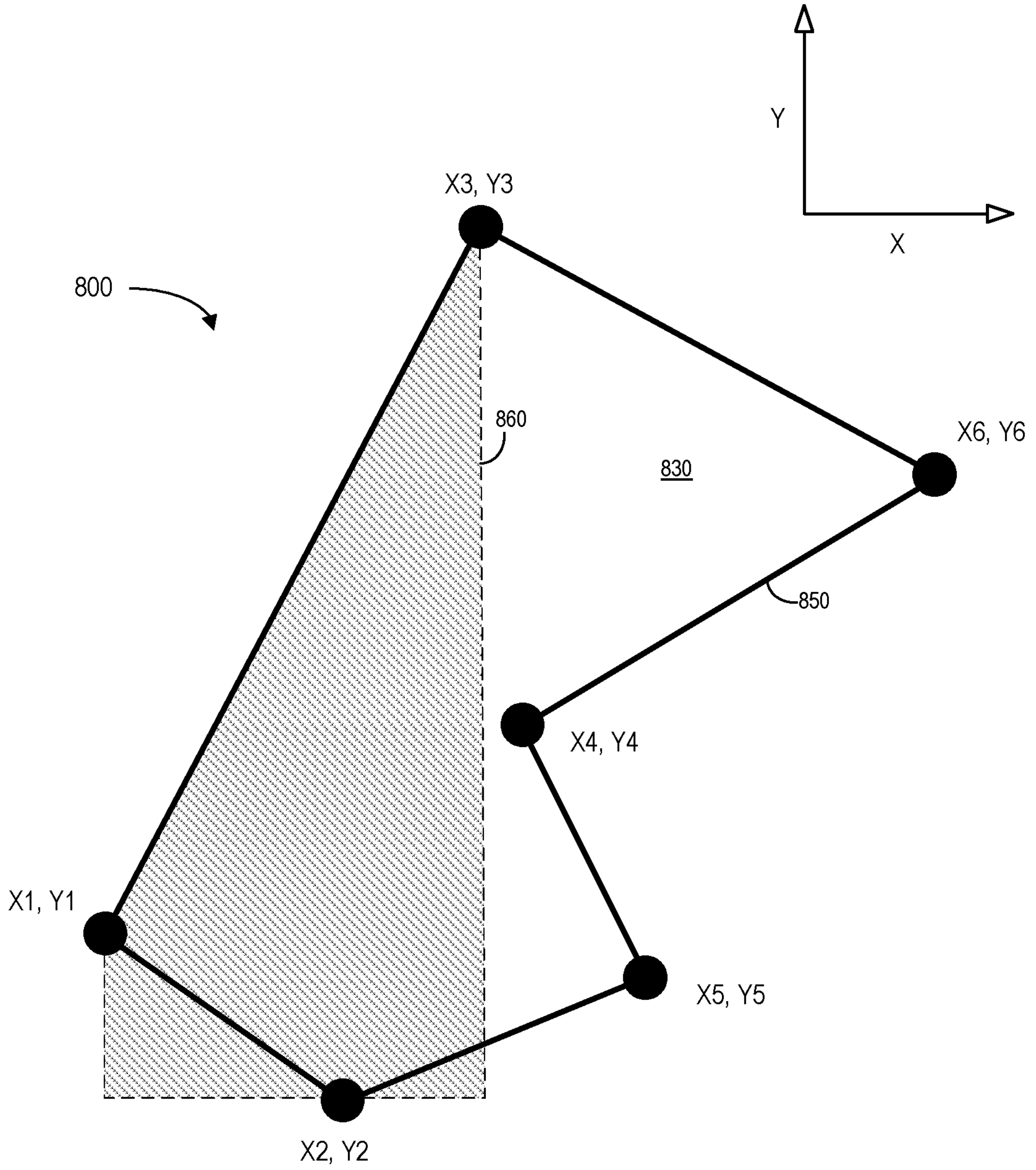
FIG. 8 illustrates adding an area associated with an environmental hazard containment system in accordance with some embodiments of the present invention.
Figure 9:
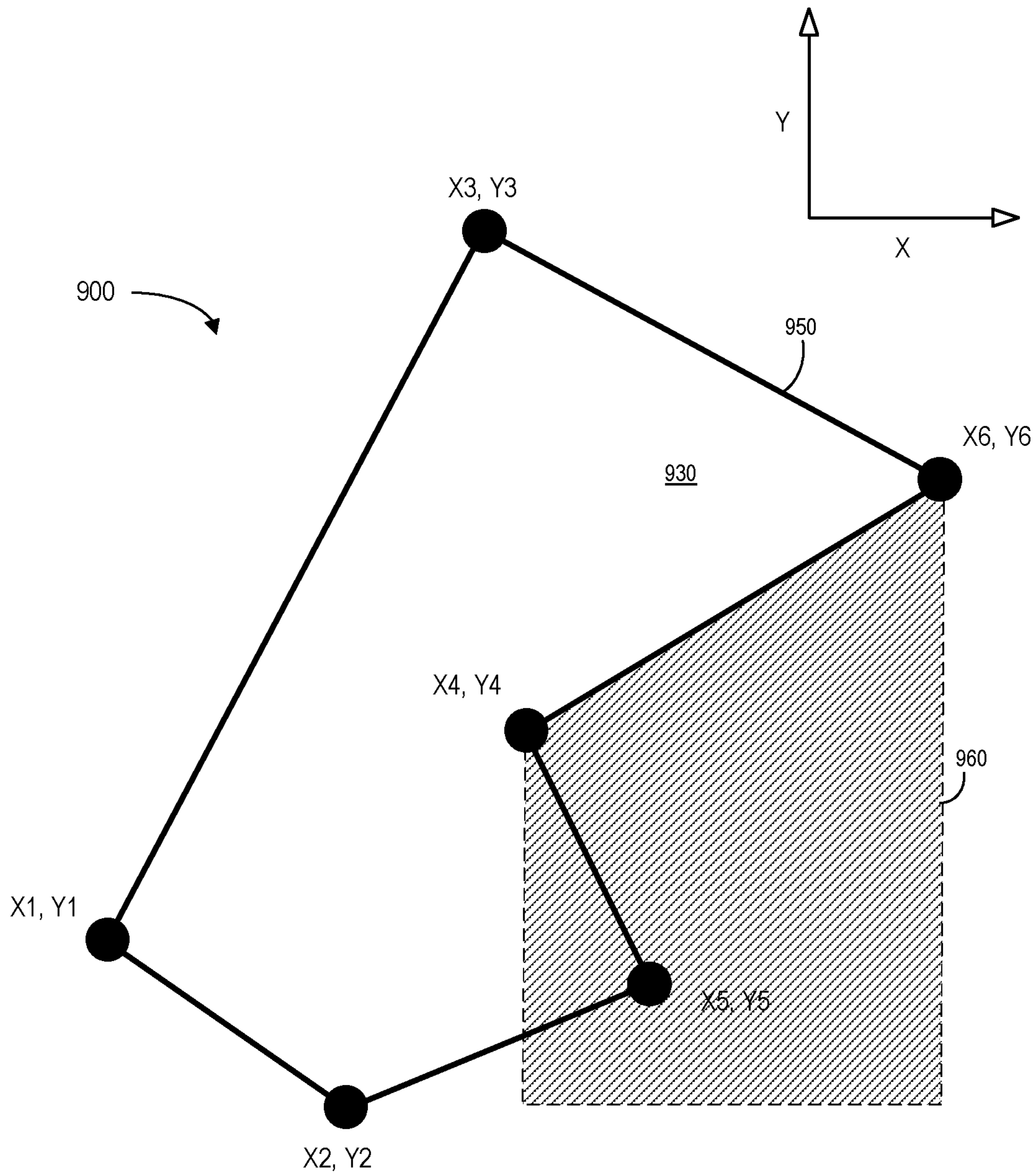
FIG. 9 illustrates subtracting an area associated with an environmental hazard containment system in accordance with some embodiments of the present invention.

In some cases, calculations about aspect of the irregular polygon 650 may be performed. For example, the size of the area 630 might be calculated and/or optimized in in view of a particular hazard's size and location. FIG. 7 illustrates a mathematical coordinate framework 700 for an environmental hazard containment system in accordance with some embodiments of the present invention. As in FIG. 7, a six-sided irregular polygon defines an area 730 having six vertexes (e.g., corners) $P_1$ though $P_6$. An X, Y coordinate has been defined for each vertex (as they appear along the X axis) as follows: $X_1, Y_1$; $X_2, Y_2$; $X_3, Y_3$; $X_4, Y_4$; $X_5, Y_5$; and $X_6, Y_6$. The area A defined by $P_1$ though $P_6$ may be calculated as follows:

$$A = \sum_{i=1}^{N} \text{area below } P_i \text{ to } P_{next}$$

where N represents the total number of vertexes (6 in the example of FIG. 7), i proceeds through each vertex as it appears in the polygon in a clock-wise fashion, and the area below each segment is to be added to, or subtracted from, A as described with respect to FIGS. 8 and 9.

Starting with $P_1$, each segment in the polygon 750 defines an area below the segment to lowest point along the Y axis ($P_2$ at $Y_2$). FIG. 8 illustrates 800 adding an area 860 below the $P_1$ to $P_3$ segment in accordance with some embodiments of the present invention. In particular, the value of the area 860 being added for this segment may be defined as follows:

$$A_{P_1 \text{ to } P_3} = (X_3 - X_1) \times \frac{((Y_1 - Y_2) - (Y_3 - Y_2))}{2}$$

The area under for each segment in the polygon may be similarly computed in a clockwise fashion: $A_{P_3 \text{ to } P_6}$; $A_{P_6 \text{ to } P_4}$; $A_{P_4 \text{ to } P_5}$; $A_{P_5 \text{ to } P_2}$; and $A_{P_2 \text{ to } P_1}$.

Note, however, that in some cases the area should be subtracted from the overall area of the polygon 860. For example, FIG. 9 illustrates 900 subtracting an area 960 $A_{P_6 \text{ to } P_4}$ in accordance with some embodiments of the present invention. In this case, the following value is to be subtracted from A:

$$A_{P_6 \text{ to } P_4} = (X_6 - X_4) \times \frac{((Y_4 - Y_2) - (Y_6 - Y_2))}{2}$$

In general, the calculated area under a segment $A_{P_a \text{ to } P_b}$ should be added to A when the segment "goes forward" ($X_b$ is greater than $X_a$) and should be subtracted from A when the segment "goes backward" ($X_b$ is less than $X_a$).

According to some embodiments, a predictive model may be used to generate appropriate containment configurations in view of the particular environmental conditions, hazard behavior, etc. The predictive model, in various implementations, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes with other environmental hazards. The specific data and outcomes analyzed vary depending on the desired functionality of the particular predictive model. The particular data parameters selected for analysis in the training process may be determined using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured data.

Figure 10:
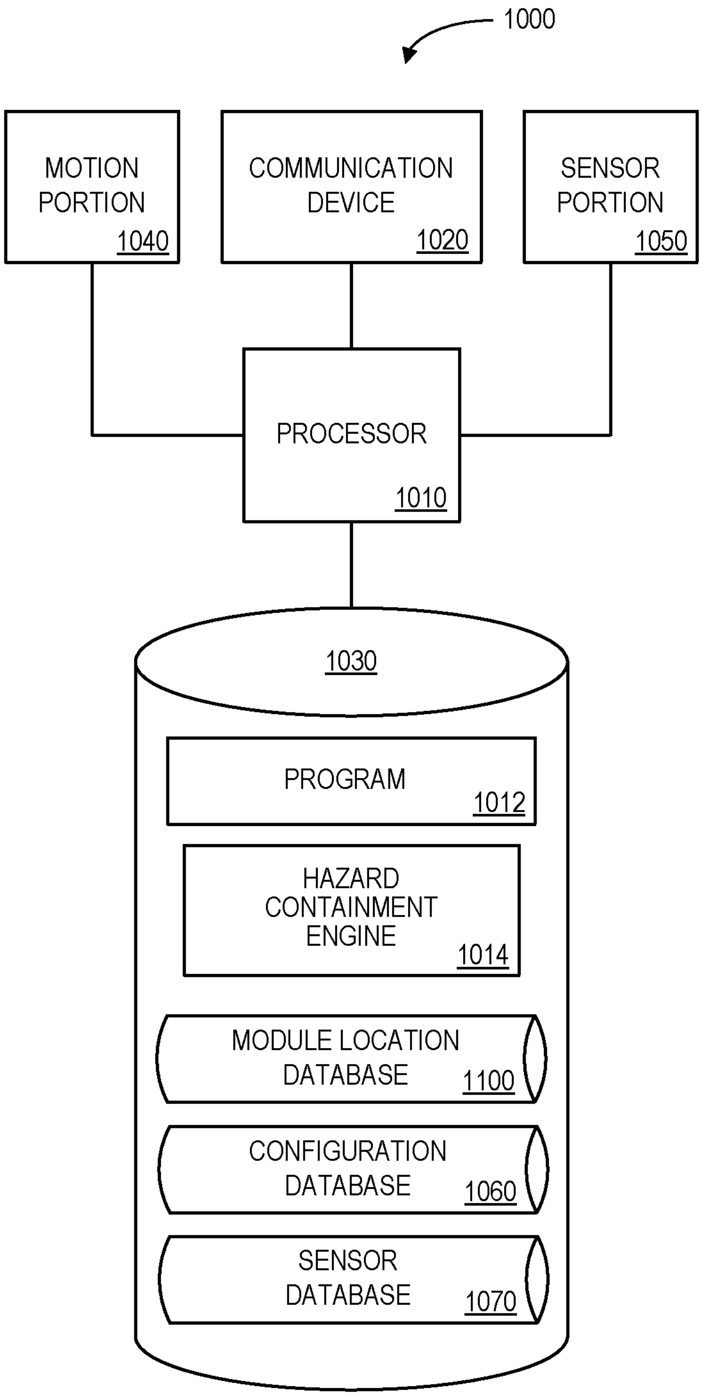
FIG. 10 is block diagram of an environmental hazard containment tool or platform according to some embodiments of the present invention.

Note that the embodiments described herein may be implemented using any number of different hardware configurations. For example, FIG. 10 illustrates an environmental hazard containment module platform 1000 that may be, for example, associated with the system 200 of FIG. 2. The environmental hazard containment module platform 1000 comprises a processor 1010, such as one or more commercially available Central Processing Units (CPUs) in the form of one-chip microprocessors, coupled to a communication device 1020 configured to communicate via a communication network (not shown in FIG. 10). The communication device 1020 may be used to communicate, for example, with one or more remote containment modules. The environmental hazard containment module platform 1000 further includes a motion portion 1040 (e.g., to move the platform 1000 within an environment) and a sensor portion 1050 (e.g., to detect where a hazard is located either in an absolute coordinate system or relative to the platform 1000).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or a hazard containment engine 1014 for controlling the processor 1010. The processor 1010 performs instructions of the programs 1012, 1014, and thereby operates in accordance with any of the embodiments described herein.

For example, the processor 1010 may exchange location information with a plurality of remote containment modules. Hazard location information associated with an environmental hazard may be detected by the processor 1010, and a containment configuration may be determined comprising a contiguous arrangement of the containment module and the plurality of remote containment modules such that the hazard location is within an area defined by the containment configuration. The motion portion 1040 may be instructed to move the containment module platform 1000 in accordance with the determined containment configuration. According to some embodiments, information associated with the containment configuration may be transmitted by the processor 1010 to the plurality of remote containment modules.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

As used herein, information may be "received" by or "transmitted" to, for example: (i) the environmental hazard containment module platform 1000 from another device; or (ii) a software application or module within the environmental hazard containment module platform 1000 from another software application, module, or any other source.

In some embodiments (such as shown in FIG. 10), the storage device 1030 further stores a module location database 1100, a configuration database 1060 (e.g., to store dynamically changing information about one or more appropriate polygons that may be used to contain a hazard), and a sensor database 1070. An example of a database that may be used in connection with the environmental hazard containment module platform 1000 will now be described in detail with respect to FIG. 11. Note that the database described herein is only one example, and additional and/or different information may be stored therein. Moreover, various databases might be split or combined in accordance with any of the embodiments described herein. For example, the configuration database and the sensor database 1070 might be combined and/or linked to each other within the hazard containment engine 1014.

Referring to FIG. 11, a table is shown that represents the module location database 1100 that may be stored at the environmental hazard containment module platform 1000 according to some embodiments. The table may include, for example, entries identifying various containment modules that available to be used in containment configurations. The table may also define fields 1102, 1104, 1106, 1108, 1110 for each of the entries. The fields 1102, 1104, 1106, 1108, 1110, 1112 may, according to some embodiments, specify: a module identifier 1102, status 1104, a location 1106, a rotation 1108, configuration data 1110, and sensor data 1112. The module location database 1100 may be created and updated, for example, based on locally detected data and/or information electrically received on a periodic basis (e.g., from other containment modules).

The module identifier 1102 may be, for example, a unique alphanumeric code identifying a particular environmental hazard containment module. The status 1104 may indicate, for example, whether the module is assigned to and/or en route to a particular containment configuration, whether it is current in place in a configuration, whether the module is not available (e.g., the module might be turned off due to a failure). The location 1106 might be, for example, GPS data, wireless location data, latitude and longitude data, relative position data, etc. and the rotation 1108 might define how the module is currently aligned (e.g., degrees from true North). The configuration data 1110 might indicate, for example, if the module is currently assigned to a particular hazard containment configuration (including which segment in the configuration) and/or a location and orientation where the module should be located. The sensor data 1112 may indicate, for example, the presence or location of an environmental hazard in absolute or relative coordinates.

Figure 12:
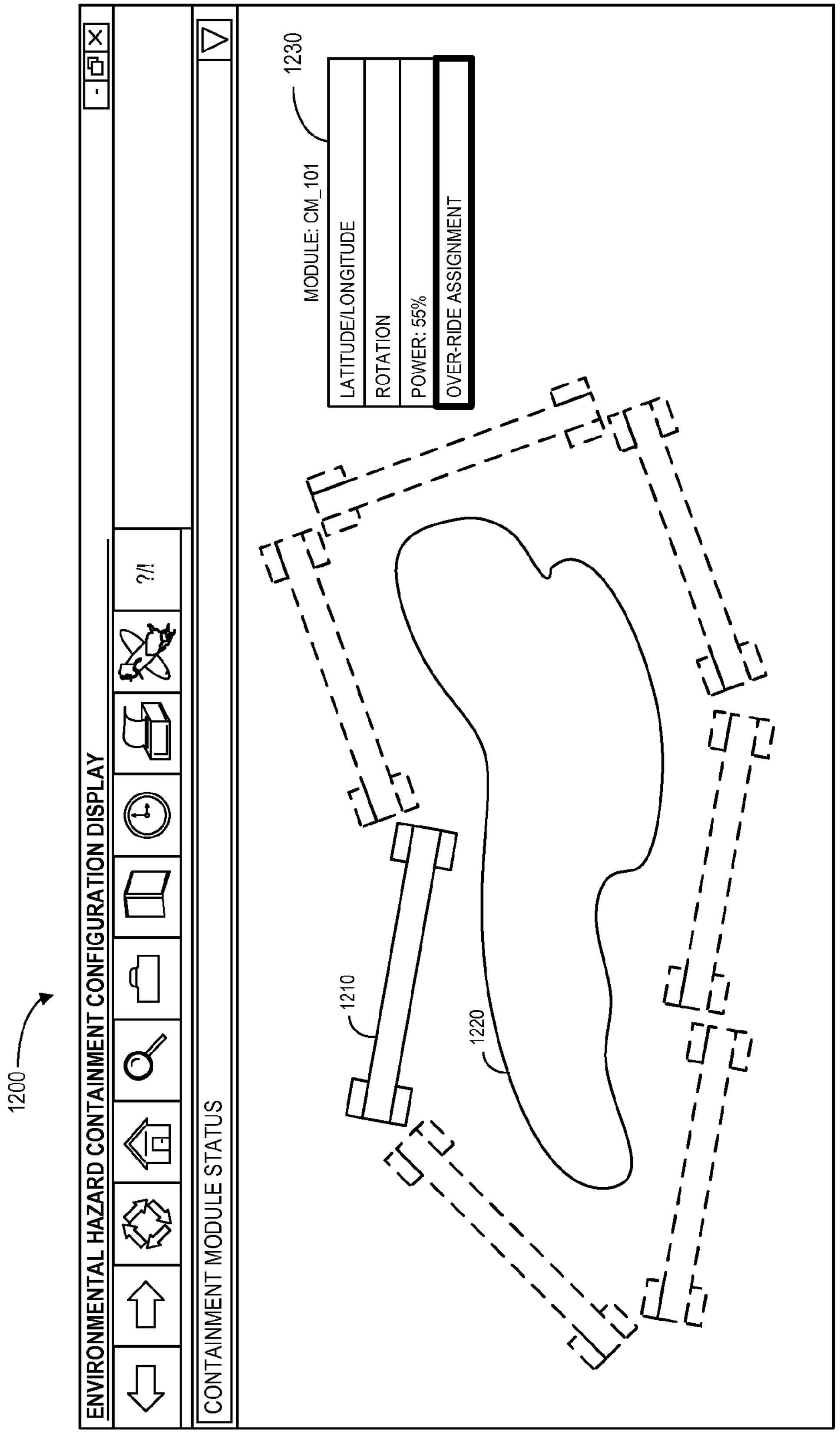
FIG. 12 illustrates a graphical user interface in accordance with some embodiments described herein.

FIG. 12 illustrates a Graphical User Interface ("GUI") display 1200 in accordance with some embodiments described herein. In particular, the display 1200 shows one or more containment modules 1210 being used to contain an environmental hazard 1220. According to some embodiments, a user might select a containment module 1210 and additional information and/or controls 1230 for that module may displayed (e.g., the modules current battery power might be displayed along with an option for the user to manually over-ride an automatically determined assignment of the module 1210 to a particular containment configuration.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An environmental hazard containment module, comprising: a module body extending along an axis from a first end to a second end opposite the first end:

a communication device to exchange location information with a plurality of remote containment modules having similar structures:

a first motion portion located at the first end of the module body and adapted to move the containment module;

a second motion portion located at the second end of the module body and adapted to move the containment module:

a first electro-magnetic attaching portion located at the first end of the module body: a second electro-magnetic attaching portion located at the second end of the module body:

a computer storage unit for receiving, storing, and providing said data indicative of the location information; and a processor in communication with the storage unit, first motion portion, second motion portion, first electro-magnetic attaching portion, and second magnetic attaching portion, wherein the processor is configured for:

detecting hazard location information associated with an environmental hazard, automatically determining a containment configuration comprising a contiguous arrangement of the containment module and the plurality of remote containment modules such that the hazard location is within an area defined by an irregular polygon having: (i) polygon segments, each segment comprising a module body, and (ii) polygon vertexes, each vertex comprising an electro-magnetic attaching portion coupled to an electro-magnetic attaching portion of a neighboring module, communicating with at least one of the motion portions to move the containment module in accordance with the determined irregular polygon, and transmitting information associated with the irregular polygon to the plurality of remote containment modules, wherein said determination of the containment configuration includes optimizing the area of the irregular polygon with respect to the hazard location information, the optimizing including:

establishing an X-Y coordinate framework for the irregular polygon having N segments such that vertexes of the irregular polygon are mapped to coordinates $X_1$, $Y_1$ through $X_n$, $Y_n$, wherein the area of the irregular polygon is calculated using:

$$A = \sum_{i=1}^{N} \text{area below } P_i \text{ to } P_{next}$$

wherein i proceeds through each vertex as it appears in the irregular polygon in a clockwise fashion, and the area below each segment is between the segment and the X-axis and is: (i) added to A when $X_i$ is greater than $X_{next}$ and subtracted from A when $X_i$ is less than $X_{next}$.

2. The environmental hazard containment module of claim 1, wherein the hazard is associated with at least one of: (i) a liquid hazard, and (ii) a fire hazard.

3. The environmental hazard containment module of claim 1, further comprising:

a sensor portion to detect the hazard location information.

4. The environmental hazard containment module of claim 1, wherein the hazard location information is received via the communication device from a remote sensor device.

5. The environmental hazard containment module of claim 1, further comprising:

an environmental hazard reduction portion.

6. The environmental hazard containment module of claim 1, wherein each containment module is associated with: (i) a latitude, (ii) a longitude, and (iii) an orientation.

7. The environmental hazard containment module of claim 1, wherein a plurality of containment configurations are determined, wherein some of the containment configurations include only remote containment modules.

8. An environmental hazard containment module method, comprising:

at the containment module, having: (i) a module body extending along an axis from a first end to a send end opposite the first end, (ii) a first motion portion located at the first end of the module body and adapted to move the containment module, (iii) a second motion portion located at the second end of the module body and adapted to move the containment module, (iv) a first electro-magnetic attaching portion located at the first end of the module body, and (v) a second electro-magnetic attaching portion located at the second end of the module body, exchanging location information with a plurality of remote containment modules having similar structures:

detecting hazard location information associated with an environmental hazard;

automatically determining a containment configuration comprising a contiguous arrangement of the containment module and the plurality of remote containment modules such that the hazard location is within an area defined by the containment configuration an irregular polygon having polygon segments, each segment comprising a module body, and polygon vertexes each vertex comprising an electro-magnetic attaching portion coupled to an electromagnetic attaching portion of a neighboring module;

communicating with at least one of the motion portions to move the containment module in accordance with the determined irregular polygon; and transmitting information associated with the irregular polygon to the plurality of remote containment modules; and wherein said determination of the containment configuration includes optimizing the area of the irregular polygon with respect to the hazard location information, the optimizing including:

establishing an X-Y coordinate framework far the irregular polygon having N segments such that vertexes of the irregular polygon are mapped to coordinates $X_1$, $Y_1$ through $X_n$, $Y_n$, wherein the area of the irregular polygon is calculated using:

$$A = \sum_{i=1}^{N} \text{area below } P_i \text{ to } P_{next}$$

wherein i proceeds through each vertex as it appears in the irregular polygon in a clockwise fashion, and the area below each segment is between the segment and the X-axis and is: (i) added to A when $X_i$ is greater than $X_{next}$ and (ii) subtracted from A when $X_i$ is less than $X_{next}$.

9. The environmental hazard containment module method of claim 8, wherein the hazard is associated with at least one of: (i) a liquid hazard, and (ii) a fire hazard.

10. The environmental hazard containment module method of claim 8, further comprising:

detecting, via a sensor portion, the hazard location information.

11. The environmental hazard containment module method of claim 8, wherein the hazard location information is received via the communication device from a remote sensor device.

12. The environmental hazard containment module method of claim 8, further comprising:

utilizing an environmental hazard reduction portion.

13. The environmental hazard containment module method of claim 8, wherein each containment module is associated with: (i) a latitude, (ii) a longitude, and (iii) an orientation.

14. The environmental hazard containment module method of claim 8, wherein a plurality of containment configurations are determined, wherein some of the containment configurations include only remote containment modules.

15. A non-transitory, computer-readable medium storing instructions adapted to be executed by a computer processor to perform a method associated with an environmental hazard containment module, said method comprising:

at the containment module, having: (i) a module body extending along an axis from a first end to a send end opposite the first end, (ii) a first motion portion located at the first end of the module body and adapted to move the containment module, (in) a second motion portion located at the second end of the module body and adapted to move the containment module, (iv) a first electro-magnetic attaching portion located at the first end of the module body, and (v) a second electro-magnetic attaching portion located at the second end of the module body, exchanging location information with a plurality of remote containment modules having similar structures;

detecting hazard location information associated with an environmental hazard;

automatically determining a containment configuration comprising a contiguous arrangement of the containment module and the plurality of remote containment modules such that the hazard location is within an area defined by the containment configuration an irregular polygon having polygon segments, each segment comprising a module body, and polygon vertexes, each vertex comprising an electro-magnetic attaching portion coupled to an electromagnetic attaching portion of a neighboring module;

communicating with at least one of the motion portions to move the containment module in accordance with the determined irregular polygon; and transmitting information associated with the irregular polygon to the plurality of remote containment modules; and wherein said determination of the containment configuration includes optimizing the area of the irregular polygon with respect to the hazard location information, and further wherein each containment module is associated with the optimizing including:

establishing an X-Y coordinate framework for the irregular polygon having N segments such that vertexes of the irregular polygon are mapped to coordinates $X_1$, $Y_1$ through $X_n$, $Y_n$, wherein the area of the irregular polygon is calculated using:

$$A = \sum_{i=1}^{N} \text{area below } P_i \text{ to } P_{next}$$

wherein i proceeds through each vertex as it appears in the irregular polygon in a clockwise fashion, and the area below each segment is between the segment and the X-axis and is: (i) added to A when $X_i$ is greater than $X_{next}$ and (ii) subtracted from A when $X_i$ is less than $X_{next}$.

16. The medium of claim 15, wherein the hazard is associated with at least one of: (i) a liquid hazard, and (ii) a fire hazard.

17. The medium of claim 15, wherein the method further comprises:

detecting, via a sensor portion, the hazard location information.

18. The medium of claim 17, wherein said determination of the containment configuration includes optimizing the area of the irregular polygon with respect to the hazard location information, and further wherein each containment module is associated with: (i) a latitude, (ii) a longitude, and (iii) an orientation, the optimizing including:

establishing an X-Y coordinate framework for the irregular polygon having N segments such that vertexes of the irregular polygon are mapped to coordinates $X_1$, $Y_1$ through $X_N$, $Y_N$, wherein the area of the irregular polygon is calculated using:

$$A = \sum_{i=1}^{N} \text{area below } P_i \text{ to } P_{next}$$

wherein i proceeds through each vertex as it appears in the irregular polygon in a clock-wise fashion, and the area below each segment is between the segment and the X-axis and is: (i) added to A when $X_i$ is greater than $X_{next}$ and (ii) subtracted from A when $X_i$ is less than $X_{next}$.

* * * * *